United States Patent [19]

DelVecchio

[11] 4,303,519
[45] Dec. 1, 1981

[54] QUICK DISCONNECT BAG FILTER

[76] Inventor: Evo DelVecchio, 2 Worcester St., Clinton, Mass. 01510

[21] Appl. No.: 896,367

[22] Filed: Apr. 14, 1978

[51] Int. Cl.³ .............................................. B01D 29/30
[52] U.S. Cl. ...................................... 210/238; 210/460
[58] Field of Search ....................... 55/374, 376, 385; 210/232, 449, 459, 460, 237, 238, 461–463, 323.2, 482; 285/161, 312

[56] References Cited

U.S. PATENT DOCUMENTS

| 150,525 | 5/1874 | Carpenter | 210/460 |
|---|---|---|---|
| 519,664 | 5/1894 | Chamberland | 210/462 |
| 1,207,480 | 5/1916 | Blake | 55/DIG. 26 |
| 1,218,975 | 3/1917 | Brison | 210/462 |
| 1,461,809 | 7/1923 | Warner | 55/DIG. 26 |
| 1,491,873 | 4/1924 | McMurtrie | 285/161 |
| 2,907,466 | 10/1959 | Beddow | 210/463 X |
| 3,067,504 | 12/1962 | Lubben et al. | 210/460 X |
| 3,259,521 | 7/1966 | Crall | 210/459 X |
| 3,314,698 | 4/1967 | Owens | 285/312 |
| 3,419,151 | 12/1968 | Smith et al. | 210/460 |
| 3,526,323 | 9/1970 | Smith | 210/460 |
| 3,707,236 | 12/1972 | Takebayasi | 210/460 X |

Primary Examiner—Robert H. Spitzer
Attorney, Agent, or Firm—Charles R. Fay

[57] ABSTRACT

A filter construction having a hose attachment therefor comprising a pair of discs one of which is indented at the periphery thereof forming a holder for a snap ring for the mouth of a filter bag, and a screw-on hose attachment extending through one disc and screwed into the other disc, holding the assembly in fixed condition, together with a quick-disconnect attachment for a hose.

1 Claim, 3 Drawing Figures

U.S. Patent  Dec. 1, 1981  4,303,519
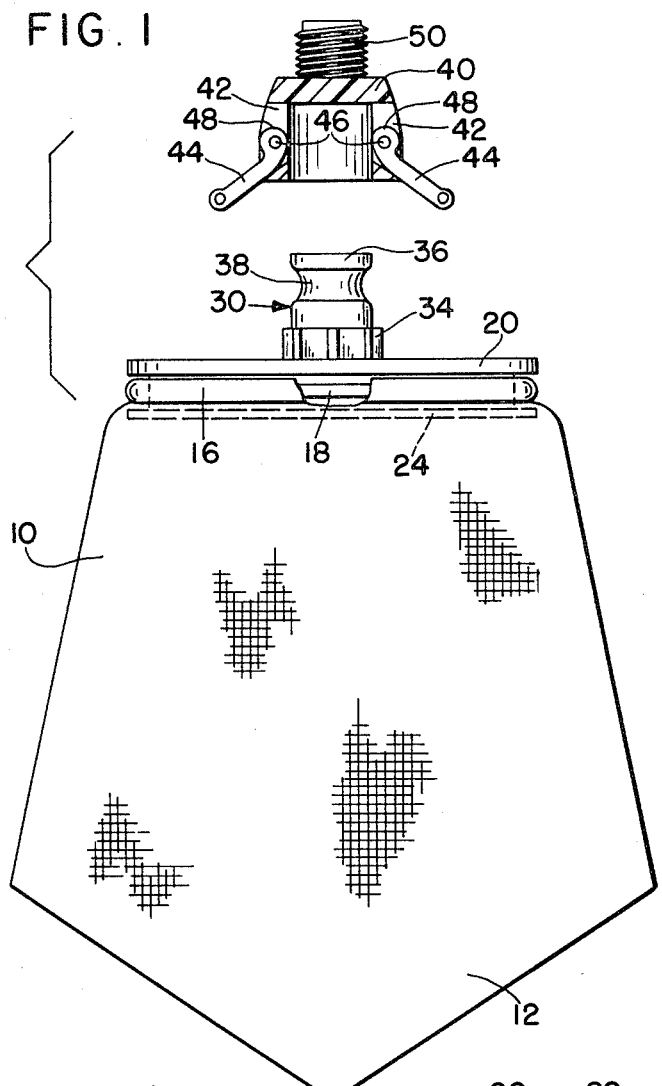
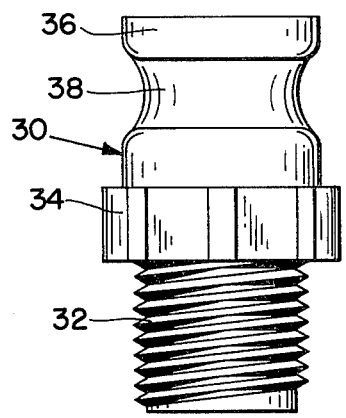
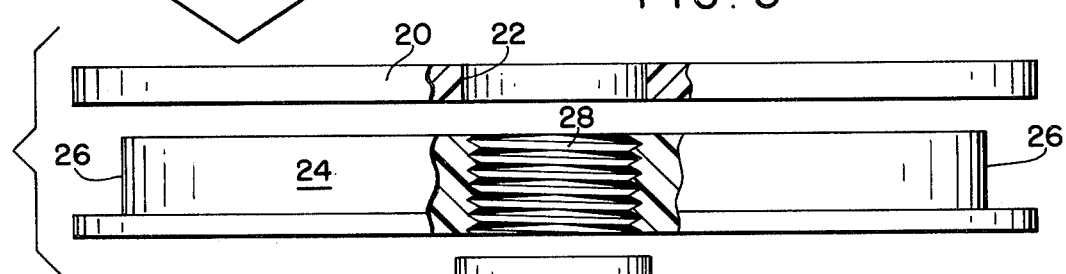
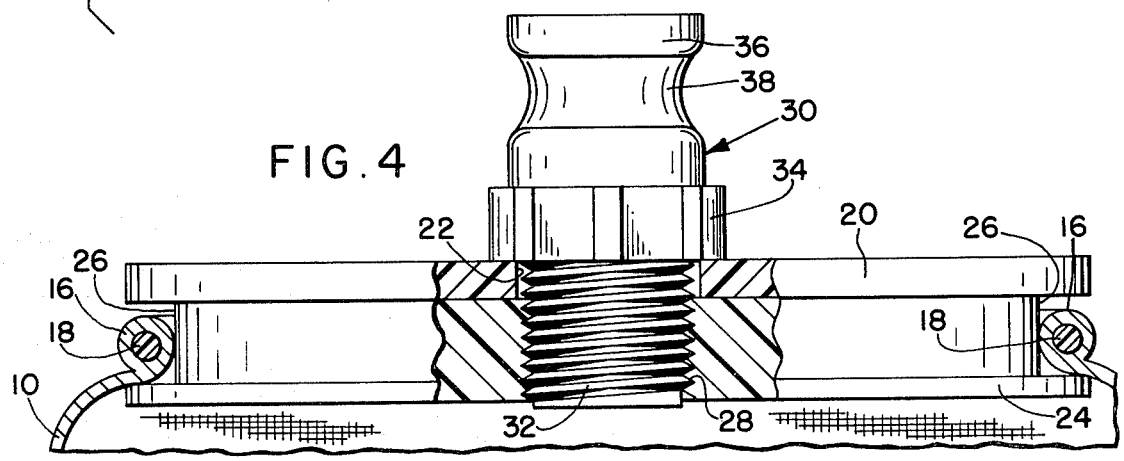

QUICK DISCONNECT BAG FILTER

BACKGROUND OF THE INVENTION

Filters in many relations particularly industrial and specifically in the plating industry cause difficulty in changing filters and providing a fixture by which the filter is held in position where it is useful; and it is the purpose of this invention to provide a simple fixture for a filter bag with a clip-on hose attachment.

SUMMARY OF THE INVENTION

A pair of plastic discs are provided, one of the discs being flat and coplanar and having a circular aperture in the center thereof, the other disc being thicker and having an indented rim portion with a threaded aperture in the center. This threaded aperture need not be originally formed but may be made simply by the action of applying the hose connection thereto.

When the two discs are placed together, the indented rim portion forms a groove to receive a snap ring contained in the edge portion or hem at the mouth of the filter bag, and this snap ring is generally smaller in diameter than the outer diameter of either disc so that when in position it is held substantially permanently between the two discs. It cannot fall off under load or under operation of whatever process requires the presence of a filter. At the same time the bag is easily detached and replaced.

A hose connection having a threaded portion is passed through the hole in the thinner disc and is threaded into the hole of the thicker disc having the indented rim portion, thereby firmly binding said discs together in a unitary assembly which is substantially permanent but at the same time is easily disassembled for changing filters.

A quick snap-on hose fitting having threads for connection to the hose may be applied to the hose connection which is threaded into the disc, and preferably has a pair of cam arms which are easily thrust into and frictionally held into a groove in the hose connection for quick attachment and disconnection of the filter assembly relative to the hose.

BRIEF DESCRIPTION OF THE DRAWINGS

FIG. 1 is an exploded view partly in section illustrating the invention;

FIG. 2 is a view in elevation on an enlarged scale illustrating one of the parts of the hose connection;

FIG. 3 is an exploded view partly in section illustrating the two plastic discs; and FIG. 4 is a view partly in section illustrating the discs connected together by a part of the hose connection and holding the snap ring with the bag filter in position.

PREFERRED EMBODIMENT OF THE INVENTION

Reference number 10 indicates a bag filter which is well-known to the art. This bag filter has a closed end 12 and an open mouth with a hem 16 enclosing a snap ring of plastic such as polyethelene or the like indicated at 18.

The bag holder comprises a relatively thin solid plastic disc 20 having a central circular opening 22 therein, and a thicker disc 24 of the same material, the discs 20 and 24 having equal diameters and similar peripheries. However, disc 24 is recessed at 26 to accept the snap ring 18, the latter having an inside diameter substantially equal to that of the bottom of the reduced portion 26 of the disc 24 so that when disc 20 overlies disc 24 as is indicated in FIGS. 3 and 4 with the snap ring 18 embodied in the groove formed thereby, the bag filter is substantially permanently secured therein and cannot accidentally escape therefrom. The disc 24 has an opening therethrough at the center thereof as at 28, this opening being slightly less in diameter than the opening 22 in the thinner disc 20.

To connect the two discs tightly together there is provided a first hose connection part generally indicated at 30. This part has a through passage and has a lower threaded portion 32, a hand grip 34, and an upper portion 36 with a narrowed waist 38 therein. The screw threaded portion 32 is thrust through hole 22 in disc 20 and the threads thereof mate with threads in the hole 28 of disc 24 or if desired merely form their own threads therein when the assembly is initially made.

The second part of the hose connection comprises a generally cylindrical member 40 with a through passage and having a pair of diametrically opposed openings 42 therein in which cam arms 44 are pivoted as at 46. When part 40 is in position to encompass part 30, the arms 44 are merely brought up in a manner to wedgedly engage the cam ends 48 of the arms 44 in the groove 38 of the connection part 30. This makes a quick connect device for the entire bag filter assembly through the hose connection member 40 which has a threaded element 50 for connection to a hose so as to supply fluid material into the bag filter 10 and pass it therethrough filtering the same. The bag filter is of a nature to allow fluid material to pass through and to retain solid parts therein.

It will be seen that it is a very simple matter to change filters simply by operating legs 44, thereby releasing the bag filter and the member 30 therefrom, the member 30 then being unscrewed and the bag filter being easily removable from the thicker disc 24, and a new bag filter then is easily replaced on the apparatus.

I claim

1. A quick disconnect bag filter apparatus comprising a first disc, a plain unimpeded opening centrally thereof, a second thicker disc commensurate with the first disc and having a threaded opening centrally thereof, said openings being aligned axially, both discs being flat and co-planar at both sides, an annular recess in the periphery of the second disc at one side thereof, the recess facing the first disc and the side having the recess being adapted to flatly contact the adjacent side thereof forming an annular groove therewith, wherein the groove is between the first disc and the larger diameter unrecessed part of the second disc, a bag filter having an open mouth, a snap-ring connected to the filter about the mouth thereof, the snap ring being adapted to be lodged in the groove, a first tubular fitting having a threaded portion passing through the opening in the first disc and detachably engaging the threads of the opening in the second disc and securing the discs together in flatwise contacting relation with the snap ring held in the groove, the snap ring having a diameter less than that of either disc, another portion of the fitting being exposed and having an annular reduced portion, a second tubular fitting having quick detach means to secure it to the first fitting in the reduced portion thereof, both fittings having corresponding fluid passages therethrough, and a hose connection to the second fitting.

* * * * *